(12) United States Patent
Bshara et al.

(10) Patent No.: US 10,614,006 B2
(45) Date of Patent: Apr. 7, 2020

(54) LOW LATENCY INTERRUPT WITH EXISTENCE OF INTERRUPT MODERATION

(71) Applicant: Amazon Technologies, Inc., Seattle, WA (US)

(72) Inventors: Said Bshara, Tira (IL); Erez Izenberg, Tel Aviv (IL); Yaniv Shapira, Bet Itzhak (IL); Nafea Bshara, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/616,832

(22) Filed: Jun. 7, 2017

(65) Prior Publication Data

US 2017/0270064 A1    Sep. 21, 2017

Related U.S. Application Data

(63) Continuation of application No. 14/027,267, filed on Sep. 16, 2013, now Pat. No. 9,697,149.

(60) Provisional application No. 61/810,748, filed on Apr. 11, 2013.

(51) Int. Cl.
*G06F 13/38* (2006.01)
*G06F 13/24* (2006.01)
*G06F 9/48* (2006.01)

(52) U.S. Cl.
CPC ............ *G06F 13/24* (2013.01); *G06F 9/4812* (2013.01); *G06F 2213/2408* (2013.01)

(58) Field of Classification Search
None
See application file for complete search history.

(56) References Cited

U.S. PATENT DOCUMENTS

| 2009/0240986 A1* | 9/2009 | Warren | G06F 11/263 714/32 |
| 2013/0198545 A1* | 8/2013 | Lee | G06F 1/3243 713/323 |

OTHER PUBLICATIONS

U.S. Appl. No. 14/027,267, "Non-Final Office Action", dated Jun. 16, 2016, 7 pages.
U.S. Appl. No. 14/027,267, "Notice of Allowance", dated Dec. 2, 2016, 7 pages.

* cited by examiner

*Primary Examiner* — Scott C Sun
(74) *Attorney, Agent, or Firm* — Kilpatrick Townsend & Stockton LLP

(57) ABSTRACT

An interrupt request generating process can include determining a first interrupt triggering event has occurred after a predetermined period of time in which no interrupt triggering event occurred. In response to determining that the first interrupt triggering event has occurred, the interrupt request generating process may generate a first interrupt request without adding an intentional delay, and initiating a timer configured to expire after a predetermined time interval. When a second interrupt triggering event is determined to have occurred before the timer expires, a second interrupt request is delayed from being generated until the timer expires.

20 Claims, 8 Drawing Sheets

```
┌─────────────────────────────────────────────────────────────────┐
│ Receiving, during a time window of a first predetermined length,│
│ first and second indications of occurrences of first and second │
│ interrupt triggering events. The first indication precedes the  │
│ second indication. 110                                          │
└─────────────────────────────────────────────────────────────────┘
                                 │
┌─────────────────────────────────────────────────────────────────┐
│ Generating, by a first circuit, in response to the reception of │
│ the first indication and without introducing a delay, a first   │
│ interrupt request that is responsive to the first indication.   │
│ 120                                                             │
└─────────────────────────────────────────────────────────────────┘
                                 │
┌─────────────────────────────────────────────────────────────────┐
│ Preventing, during a predetermined delay period after the       │
│ triggering of the first interrupt request, a triggering of a    │
│ second interrupt request that is responsive to the second       │
│ indication. 130                                                 │
└─────────────────────────────────────────────────────────────────┘
                                 │
┌─────────────────────────────────────────────────────────────────┐
│ Generating, after the predetermined delay period ends, the      │
│ second interrupt request. 140                                   │
└─────────────────────────────────────────────────────────────────┘
```

LOW LATENCY INTERRUPT WITH EXISTENCE OF INTERRUPT MODERATION

RELATED APPLICATIONS

This patent application is a continuation of U.S. application Ser. No. 14/027,267 filed Sep. 16, 2013, now U.S. Pat. No. 9,697,149 issued on Jul. 4, 2017, which claims the priority of U.S. Provisional Application No. 61/810,748 filed Apr. 11, 2013, the entire contents of which are herein incorporated by reference.

BACKGROUND

Interrupt requests are mechanisms to notify a processor about an event (an interrupt triggering event) in an asynchronous way.

Sometimes a series of events could happen within a short period of time causing the processor to be bombarded with many interrupt requests in short period of time that could potentially lead to inefficient performance.

FIG. 1 illustrates the occurrence of three interrupt triggering events—represented by indications In1-In3 11-13. The indication about the occurrence of the first event In1 11 triggers (arrow 31) a generation of an interrupt request (the interrupt request signal 20 is de-asserted at time 21), that is followed by generating another interrupt request (in response to In 2 12—arrow 32 at time 22 causes the interrupt request signal 20 to maintain low till point in time 32). The indication about the occurrence of the third event In3 13 triggers (arrow 33) a generation of an interrupt request (the interrupt request signal 20 is de-asserted at time 24).

To overcome this, few implementations added the notion of "interrupt coalescing" or "interrupt moderation".

Interrupt moderation includes delaying the generating of each interrupt request. Each interrupt request or a group of interrupt requests have an associated timer. At a moment an indication about an occurrence of an interrupt triggering event is received, the timer (associated with that interrupt triggering event) is loaded and start counting (either loaded a value and count down to zero, or start from zero and count up to a limit).

FIG. 2 illustrates the occurrence of three interrupt triggering event—represented by indications In1-In3 11-13. The indication about the occurrence of the first event In1 11 causes (arrow 43) a timer to count for n cycles thereby delaying the generation of a "merged" interrupt request after a delay 42 lapses from the reception of In11. When the delay ends (arrow 51) a "merged" interrupt request 61 is generated (the interrupt request signal 60 is de-asserted).

Accordingly—each interrupt request is not asserted until the timer expires, and this will enable the potential accumulation of multiple interrupt triggering events that could have happened in time proximity, and only assert the interrupt request once after the timer expires.

To reduce the number of interrupt requests, many network interface controllers (NICs) use interrupt moderation. With interrupt moderation, the NIC will not generate an interrupt request immediately after it receives a packet (the reception of a packet is an interrupt triggering event). Instead, the NIC introduced a delay and waits for more packets to arrive, or for a time-out to expire, before generating an interrupt request. The NIC vendor specifies the maximum number of packets, time-out interval, or other interrupt moderation algorithm—but in any case each interrupt request is delayed.

The measured round-trip time for a packet is one of the most commonly used techniques to determine the network bandwidth between two endpoints. However, when interrupt moderation is enabled, receiving a packet does not generate an immediate interrupt request and therefore the perceived round-trip time for a particular packet becomes larger than the average time. To allow accurate measurement of round trip time for a packet, NDIS provides the ability to disable and enable interrupt moderation—thus either all interrupt requests are delayed or all interrupt requests are not delayed.

The downside of this implementation—once interrupt moderation is enabled, and the timer is used, it is perceived that the latency is high due to this coalescing impact latency sensitive applications This caused many vendors not to implement interrupt moderation or give the option to disable it for latency sensitive applications.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4 illustrates a method according to an embodiment of the invention;

DETAILED DESCRIPTION OF THE DRAWINGS

Figure 1:
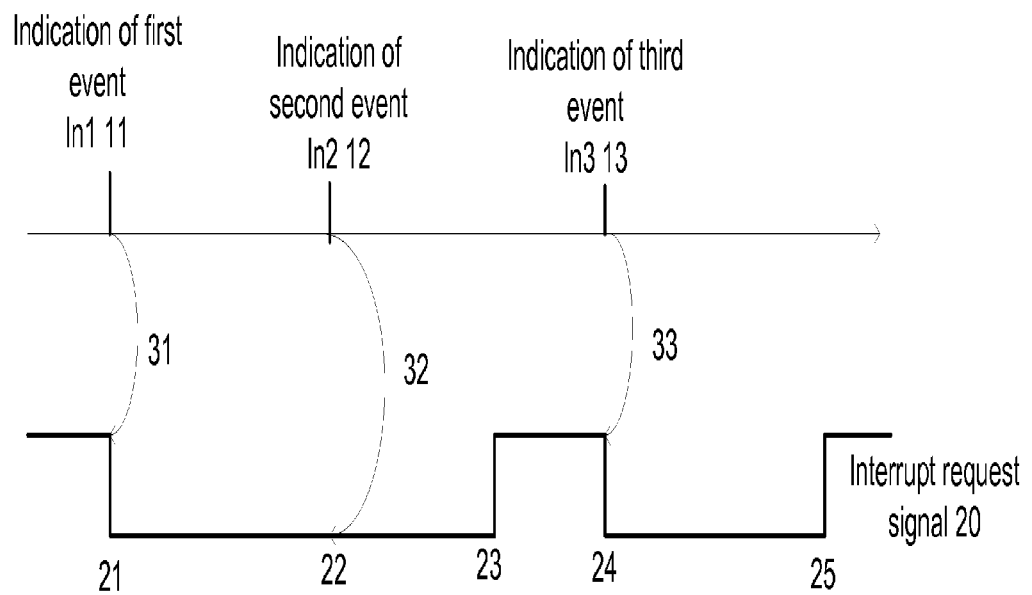
FIG. 1 is a prior art timing diagram.
Figure 2:
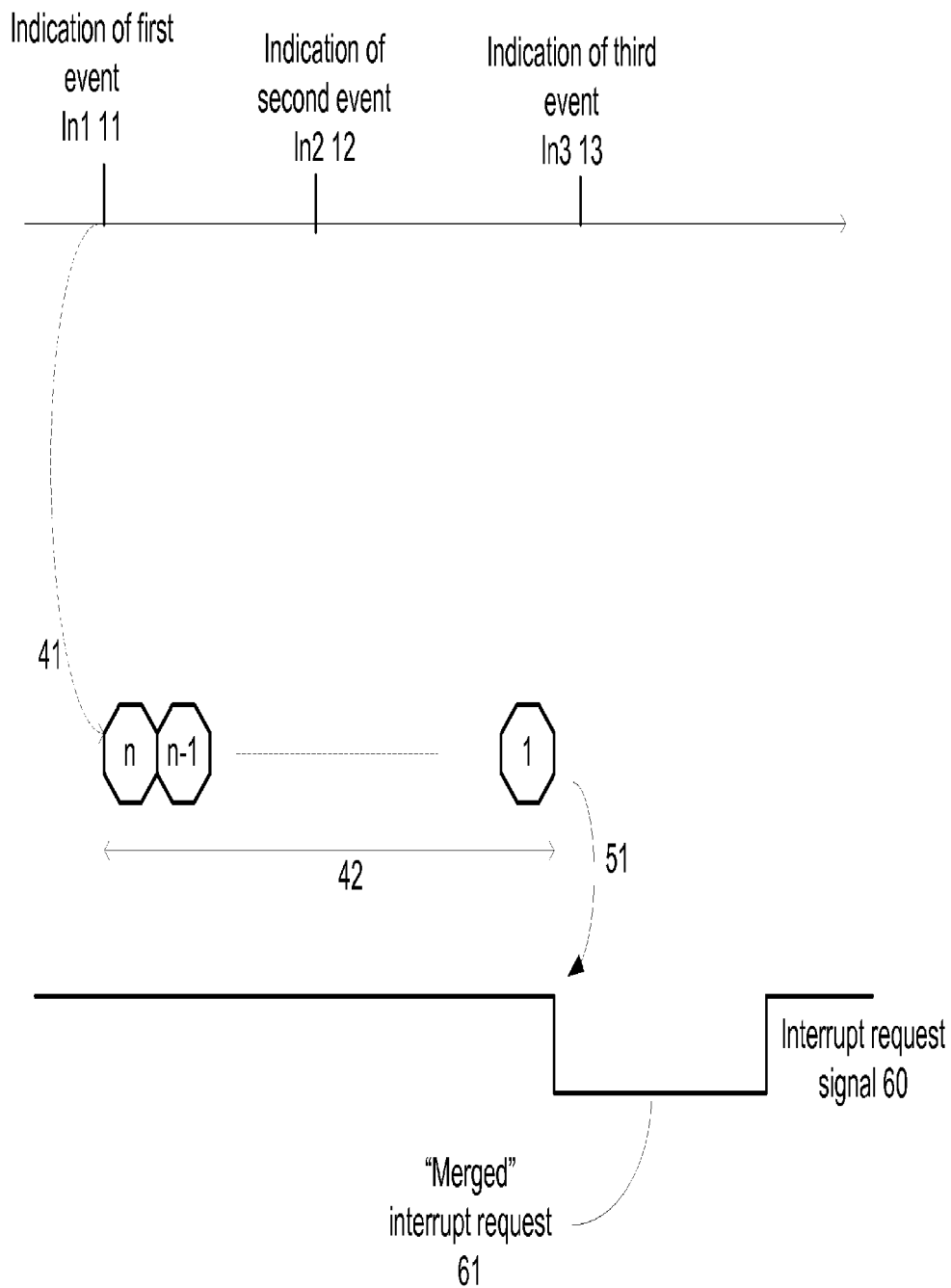
FIG. 2 is a prior art timing diagram.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

There is provide a system, method an non-transitory computer readable medium for selectively delaying interrupt requests and especially for not delaying a generation of a first interrupt request that is responsive to an occurrence of a first interrupt triggering event and delaying the generating of other interrupt requests that are responsive to the occurrence of other interrupt triggering events that follow the first interrupt triggering event—within a time window of a predefined period.

Thus—interrupt triggering events that occur relatively sparsely will trigger without delay interrupt requests—thus introducing a low latency response. On the other hand—the occurrence of multiple interrupt triggering event in proximity to each other will cause all but the first interrupt request to be delayed—and to allow interrupt coalescing of all but the first interrupt request.

There is provided a method that may include generating an interrupt request as soon as possible, but then mask the consequent ones for a timer period. This way, in a system with low rate of events, interrupt requests are rarely subject to moderation timer, and in system with high rate of events, the first event is never delayed but the consequent events are coalesced (if possible) into a single interrupt request following the timer expiration.

Figure 3:
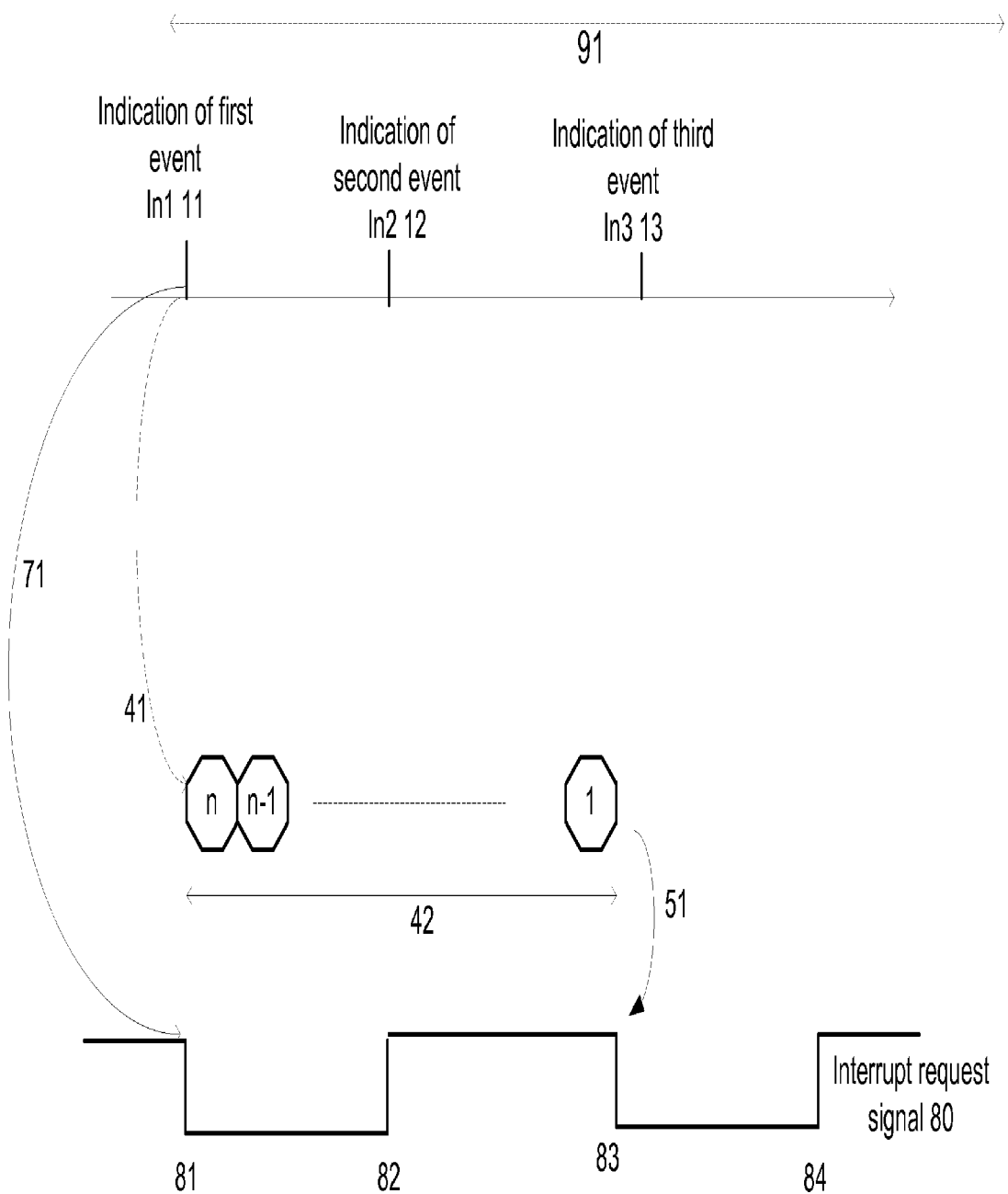
FIG. 3 is a timing diagram according to an embodiment of the invention.

FIG. 3 is a timing diagram according to an embodiment of the invention.

It illustrates the occurrence of three interrupt triggering events—represented by indications In1-In3 11-13.

The indication about the occurrence of the first event In1 11 triggers (arrow 71) a generation of an interrupt request (the interrupt request signal 80 is de-asserted at time 81).

In addition—In1 11 also causes (arrow 41) a timer to count for n cycles thereby delaying the generation of a "merged" interrupt request—responsive to In2 12 and Ic3 13 after a delay 42 lapses from the reception of In 11. When the delay ends (arrow 51) a "merged" interrupt request 61 is generated (the interrupt request signal 81 is de-asserted between points of time 83 and 84)—this "merged" interrupt request ignores the occurrence of the first interrupt triggering event and is responsive to the reception of In2 12 and In3 13.

After a lapse of a time window (of a predefined length 91) from the reception of In1 11—the process may repeats itself—and treat the next interrupt triggering event as the first interrupt triggering event.

Figure 7:
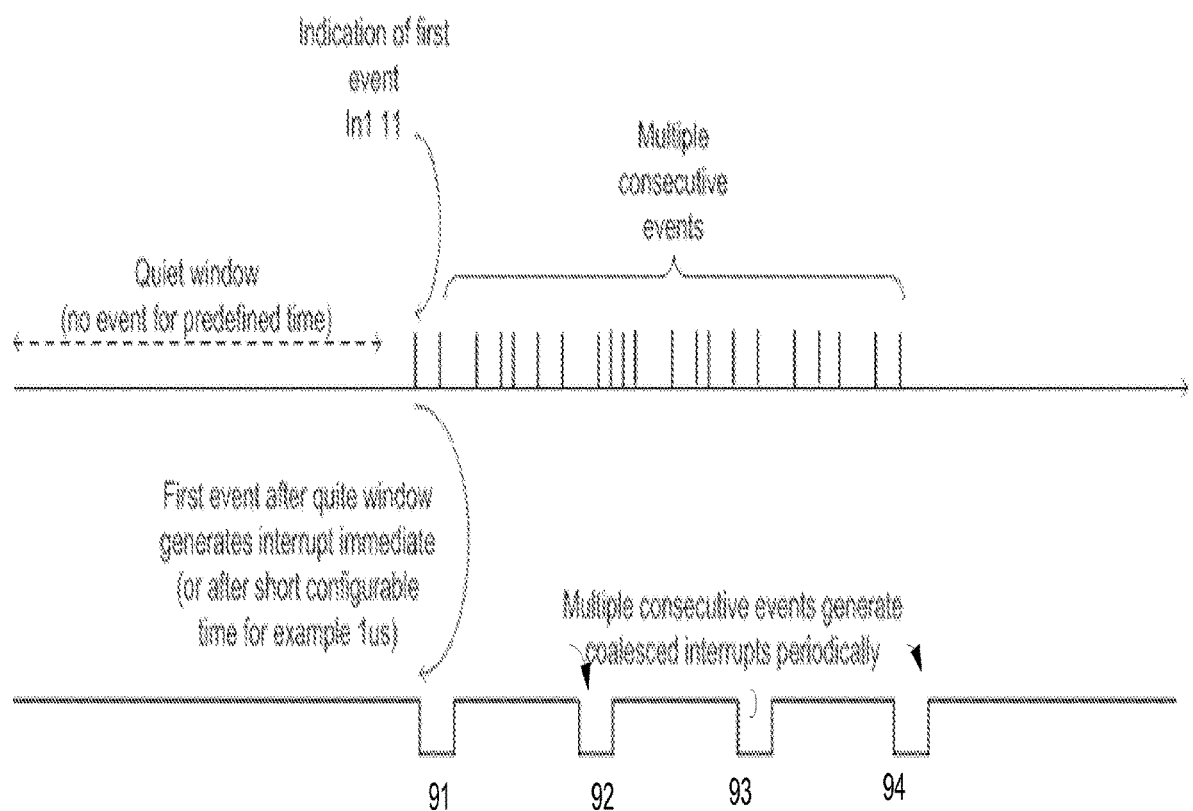
FIG. 7 is a timing diagram according to an embodiment if the invention.

FIG. 7 illustrates a timing diagram in which a first indication about an interrupt triggering event that is not preceded (for at least a predefined duration) by any interrupt request immediately triggers a interrupt request 92 while the occurrence of interrupt triggering request that follow the first interrupt request generate delayed coalesced interrupt requests.

FIG. 4 illustrates a method 100 according to an embodiment of the invention.

Method 100 may start by stage 110 of receiving, during a time window of a first predetermined length, first and second indications of occurrences of first and second interrupt triggering events. The first indication precedes the second indication.

Stage 110 may be followed by stage 120 of generating, by a first circuit, in response to the reception of the first indication and without introducing a delay, a first interrupt request that is responsive to the first indication. Stage 120 starts after the first indication is received—without waiting to the reception of the second indication.

Stage 120 may be followed by stage 130 of preventing, during a predetermined delay period after the generating of the first interrupt request, a generating of a second interrupt request that is responsive to the second indication.

Stage 130 may be followed by stage 140 of generating, after the predetermined delay period ends, the second interrupt request.

Stage 110 may include receiving during the time window at least one additional indication of an occurrence of at least one interrupt triggering event. Stage 130 may include preventing, during the predetermined delay period after the generating of the first interrupt request, a generating of one or more additional interrupt requests that are responsive to the at least one additional indication. Stage 140 may include generating an additional interrupt request in response to a plurality of indications out of the second indication and the at least one additional indication. The number of interrupt requests can be smaller than the number of the additional indications received.

The first circuit may be a network interface controller (NIC) or an interrupt controller.

The first predetermined length (of the time window) exceeds 1 millisecond.

For example, a 10 GbE networking controller could be received up to 15 million interrupts per second if there was an interrupt event set on every packet, and all packets where in smallest size possible. To reduce this to a tolerable interrupt, for example, 1,000 interrupts per second, an interrupt moderation time is set for 1 millisecond. However, if the user/application can not tolerate 1 milisecond latency on the first interrupt, then the first predetermined length could be set for example to 50 uS which is what the user/application defined as acceptable for first packet.

Figure 5:
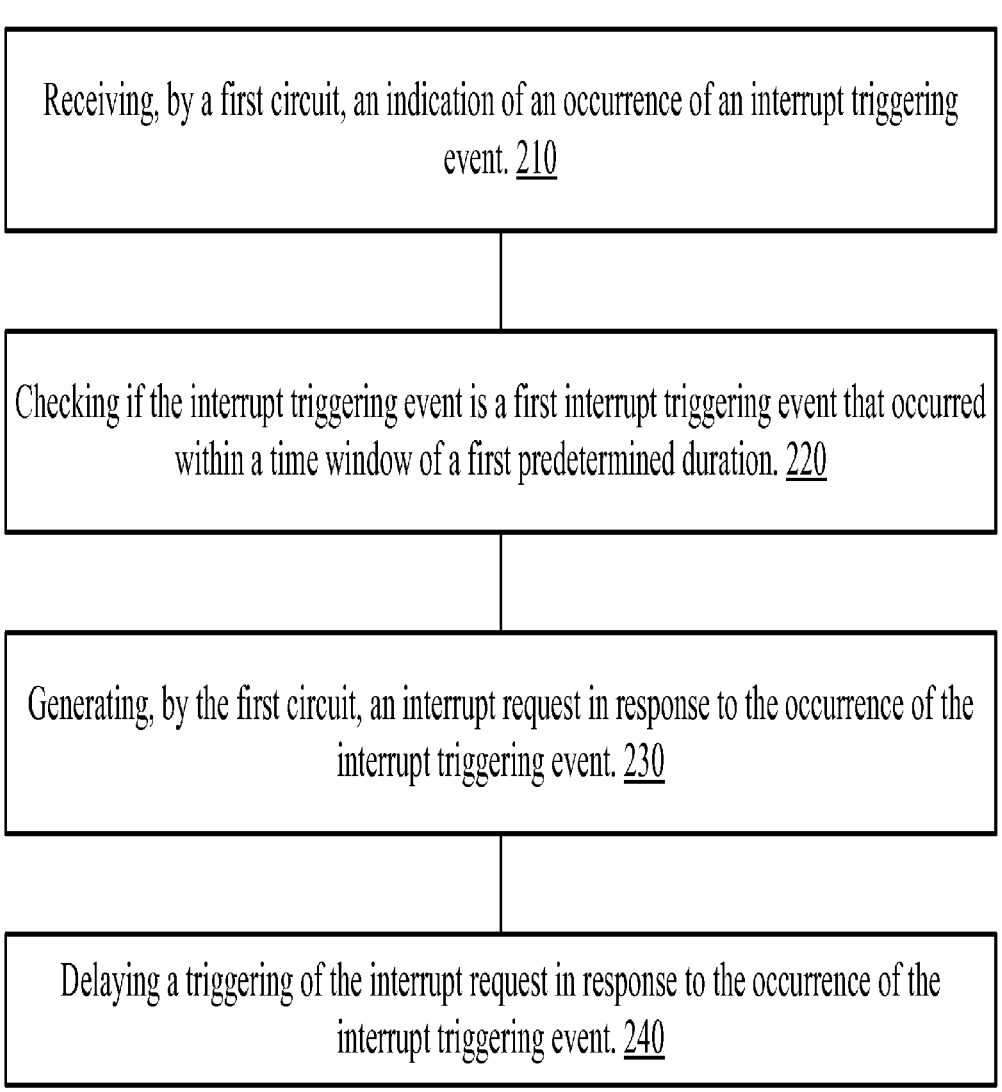
FIG. 5 illustrates a method according to an embodiment of the invention.

FIG. 5 illustrates a method 200 according to an embodiment of the invention.

Method 200 may start by stage 210 of receiving, by a first circuit, an indication of an occurrence of an interrupt triggering event.

Stage 220 may be followed by stage 220 of checking if the interrupt triggering event is a first interrupt triggering event that occurred within a time window of a first predetermined duration.

If the answer is positive then stage 220 may be followed by stage 230 of generating, by the first circuit, an interrupt request in response to the occurrence of the interrupt triggering event.

Else—stage 220 may be followed by stage 240 of delaying a generating of the interrupt request in response to the occurrence of the interrupt triggering event.

Figure 8:
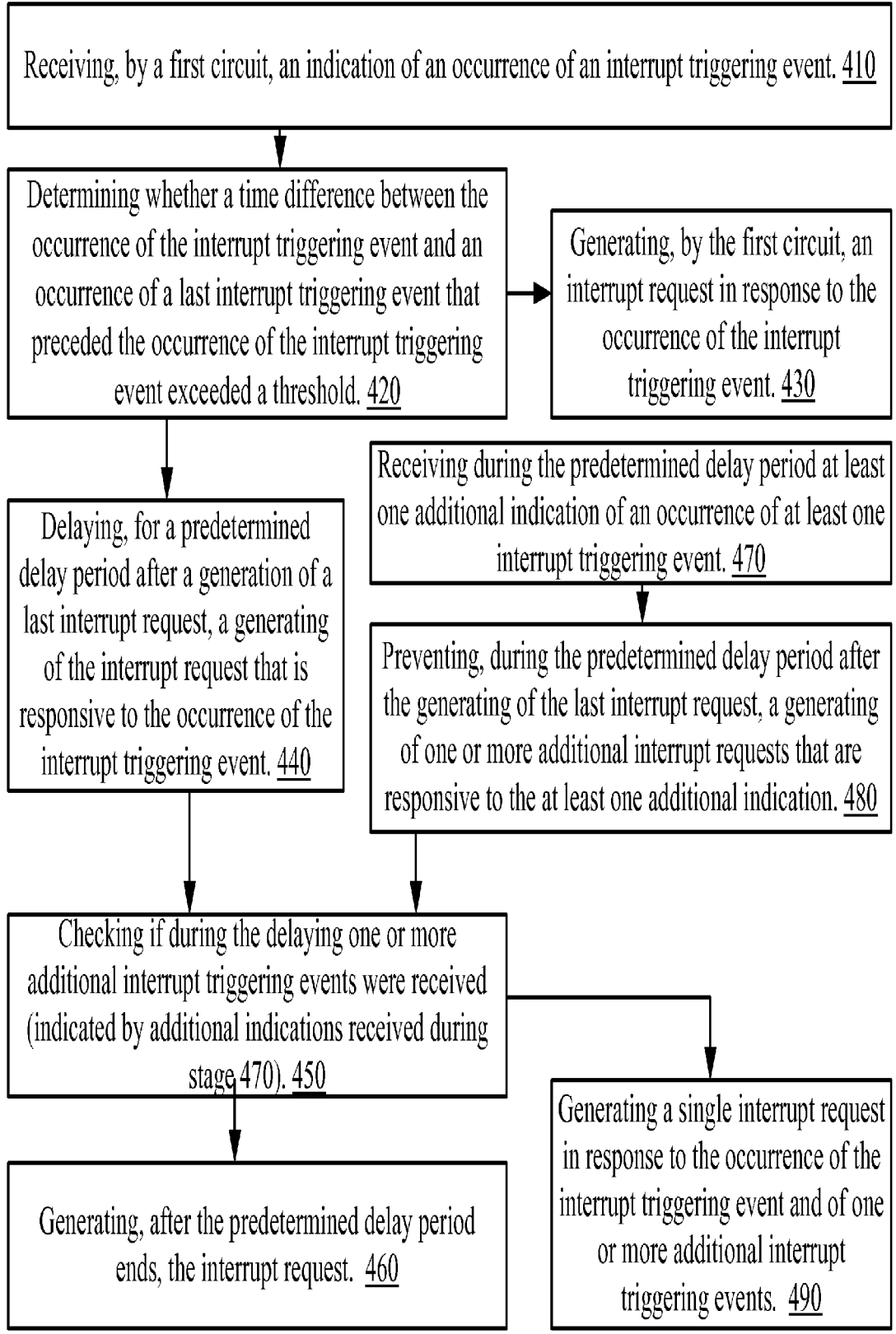
FIG. 8 illustrates a method according to an embodiment of the invention.

FIG. 8 illustrates method 400 according to an embodiment of the invention.

Method 400 starts by stage 410 of receiving, by a first circuit, an indication of an occurrence of an interrupt triggering event.

Stage 410 is followed by query stage 420 of determining whether a time difference between the occurrence of the interrupt triggering event and an occurrence of a last interrupt triggering event that preceded the occurrence of the interrupt triggering event exceeded a threshold. The threshold may exceed one millisecond or any desired time period. It may be defined in response to an expected behavior of the environment of the first circuit or of the first circuit itself. For example—it may be set in response to expected idle periods between bursts of communication signals.

If yes—stage 420 is followed by stage 430 of generating, by the first circuit, an interrupt request in response to the occurrence of the interrupt triggering event.

If no—stage 420 is followed by stage 440 delaying, for a predetermined delay period after a generation of a last interrupt request, a generating of the interrupt request that is responsive to the occurrence of the interrupt triggering event.

Thus, if after a long enough time during which there was not interrupt triggering event, a group of relatively close interrupt triggering events occurs, only the occurrence of the first interrupt triggering event will be responded by sending an interrupt request without intentionally introducing delay.

Method 400 may include stage 470 of receiving during the predetermined delay period at least one additional indication of an occurrence of at least one interrupt triggering event.

Stage 470 may be followed by stage 480 of preventing, during the predetermined delay period after the generating of the last interrupt request, a generating of one or more additional interrupt requests that are responsive to the at least one additional indication.

Method 400 may support interrupt coalescing. A single interrupt can be generated due to the occurrence of multiple interrupt triggering events—except an interrupt triggering event that was handled without delay during stage 430.

Thus, stage 440 may be followed by stage 450 of checking if during the delaying one or more additional interrupt triggering events were received (indicated by additional indications received during stage 470).

If no—jumping to stage 460 of generating, after the predetermined delay period ends, the interrupt request.

If yes—jumping to stage 490 of generating a single interrupt request in response to the occurrence of the interrupt triggering event and of one or more additional interrupt triggering events.

Thus, stage 490 may include generating a single interrupt request in response to the occurrence (indicated by an indication received during stage 410) of the interrupt triggering event and of one or more additional interrupt triggering events (indicated by one or more indication received during stage 470).

Stage 490 may include generating one or more additional interrupt requests due to the occurrence of multiple occurrences additional interrupt triggering events.

Figure 6:
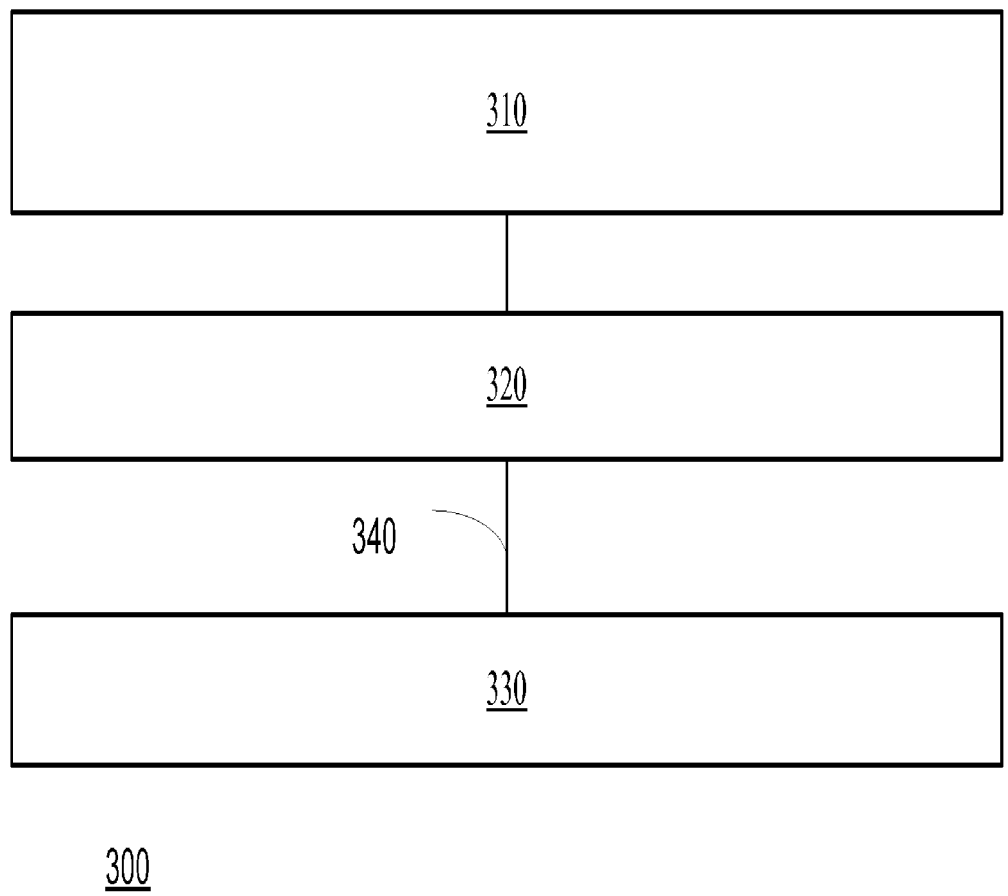
FIG. 6 illustrates a system according to an embodiment of the invention.

FIG. 6 illustrates a system 300 according to an embodiment of the invention.

System 300 may include a processor but may be coupled to a processor. FIG. 6 illustrates system 300 as including processor 310. The system 300 may also include an interface 320 and an interrupt request generator 330.

The interface 320 may be arranged to receive during a time window of a first predetermined length first and second indications of occurrences of first and second interrupt triggering events; wherein the first indication precedes the second indication.

The interrupt request generator 320 is arranged to trigger in response to the reception of the first indication and without introducing a delay, a first interrupt request that is responsive to the first indication; and to prevent, during a predetermined delay period after the generating of the first interrupt request, a generating of a second interrupt request that is responsive to the second indication.

The interrupt request generator 320 sends interrupt requests to processor 330 via line 340.

System 300 may execute, for example, method 400. The interface 310 may be arranged to receive an indication of an occurrence of an interrupt triggering event. The interrupt request generator 320 may be arranged to: determine whether a time difference between the occurrence of the interrupt triggering event and an occurrence of a last interrupt triggering event that preceded the occurrence of the interrupt triggering event exceeded a first threshold; generate an interrupt request in response to the occurrence of the interrupt triggering event if the time difference exceeded the threshold; and delay, for a predetermined delay period after a generation of a last interrupt request, a generating of the interrupt request that is responsive to the occurrence of the interrupt triggering event if the time difference is shorter than the threshold.

The interrupt request generator 320 is arranged to generate, after the predetermined delay period ends, the interrupt request.

The interface 310 may be arranged to receive during the predetermined delay period at least one additional indication of an occurrence of at least one interrupt triggering event. The interrupt request generator 320 may be arranged to prevent, during the predetermined delay period after the generating of the last interrupt request, a generating of one or more additional interrupt requests that are responsive to the at least one additional indication.

The interrupt request generator 320 may be arranged to generate an additional interrupt request in response to the at least one additional indication.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for generating interrupt requests, the method comprising:
    determining a first interrupt triggering event has occurred after a predetermined period of time in which no interrupt triggering event occurred;
    in response to determining that the first interrupt triggering event has occurred:
        generating a first interrupt request after a configurable time; and
        initiating a timer configured to expire after a predetermined time interval, wherein the configurable time is greater than zero and less than a duration of the predetermined time interval;
    determining a second interrupt triggering event has occurred before the timer expires; and
    delaying a second interrupt request from being generated until the timer expires.

2. The method of claim 1, further comprising:
    determining a third interrupt triggering event has occurred before the timer expires; and
    generating a coalesced interrupt request corresponding to the second and third interrupt triggering events when the timer expires.

3. The method of claim 1, wherein a duration of the predetermined period of time is equal to a duration of the predetermined time interval.

4. The method of claim 1, wherein a duration of the predetermined period of time is different than a duration of the predetermined time interval.

5. The method of claim 1, wherein the first interrupt triggering event corresponds to reception of a packet.

6. The method of claim 5, wherein the first interrupt request is used to determine a round trip delay of the packet.

7. The method of claim 1, wherein the predetermined period of time is set based on an expected idle period between bursts of communications.

8. The method of claim 1, further comprising sending the first interrupt request to a processor.

9. A circuit comprising:
    an interface configured to detect interrupt triggering events; and
    an interrupt request generator configured to:
        determine a first interrupt triggering event has occurred after a predetermined period of time in which no interrupt triggering event occurred;
        in response to determining that the first interrupt triggering event has occurred, generate a first interrupt request after a configurable time;
        determine a second interrupt triggering event has occurred within a predetermined time interval after the first interrupt triggering event; and
        delay a second interrupt request from being generated until the predetermined time interval has elapsed,
        wherein the configurable time is greater than zero and less than a duration of the predetermined time interval.

10. The circuit of claim 9, wherein the interrupt request generator is further configured to:
    determine a third interrupt triggering event has occurred before the predetermined time interval has elapsed; and
    generate a coalesced interrupt request corresponding to the second and third interrupt triggering events when the predetermined time interval elapses.

11. The circuit of claim 9, further comprising:
    a timer configured to expire when the predetermined time interval elapses.

12. The circuit of claim 11, wherein the timer is implemented as a counter.

13. The circuit of claim 9, wherein the circuit is coupled to a processor configured to receive the first interrupt request.

14. The circuit of claim 9, wherein the circuit is implemented in a network interface controller or a interrupt controller.

15. The circuit of claim 9, wherein the first interrupt triggering event corresponds to reception of a packet.

16. A method for generating interrupt requests, the method comprising:
    determining a first interrupt triggering event has occurred after a predetermined period of idle time;
    in response to determining that the first interrupt triggering event has occurred, generating a first interrupt request after a configurable time that is greater than zero and less than a duration of a predetermined time interval;
    determining a plurality of subsequent interrupt triggering events have occurred during consecutive first and second predetermined time intervals, wherein one of the subsequent interrupt triggering events occurred in the first predetermined time interval and another one of the subsequent interrupt triggering events occurred in the second predetermined time interval;
    generating a second interrupt request at the end of the first predetermined time interval; and
    generating a third interrupt request at the end of the second predetermined time interval.

17. The method of claim 16, wherein a duration of the predetermined period of idle time is greater than a duration of the first or second predetermined time interval.

18. The method of claim 16, wherein each interrupt triggering event corresponds to a network packet communication.

19. The method of claim 16, wherein each interrupt request is generated by a network interface controller.

20. The method of claim 16, wherein a counter is used to determine the end of the first and second predetermined time intervals.

* * * * *